United States Patent
Lockwood

(10) Patent No.: US 6,727,292 B2
(45) Date of Patent: Apr. 27, 2004

(54) MANUFACTURE OF MDI-TDI BASED FLEXIBLE POLYURETHANE FOAMS

(75) Inventor: Robert J. Lockwood, Macomb, MI (US)

(73) Assignee: Huntsman International LLC, Salt Lake City, UT (US)

( * ) Notice: Subject to any disclaimer, the term of this patent is extended or adjusted under 35 U.S.C. 154(b) by 285 days.

(21) Appl. No.: 09/920,418

(22) Filed: Aug. 1, 2001

(65) Prior Publication Data

US 2002/0040072 A1 Apr. 4, 2002

Related U.S. Application Data

(60) Provisional application No. 60/222,446, filed on Aug. 1, 2000.

(51) Int. Cl.⁷ .............................................. C08G 18/10
(52) U.S. Cl. ...................... 521/130; 521/160; 521/170; 521/174
(58) Field of Search ................................ 521/130, 160, 521/170, 174

(56) References Cited

U.S. PATENT DOCUMENTS

| | | |
|---|---|---|
| 3,492,251 A | 1/1970 | Gemeinhardt |
| 4,180,246 A | 12/1979 | Guy |
| 4,256,849 A | 3/1981 | Ick et al. |
| 4,278,770 A | 7/1981 | Chandalia et al. |
| 4,365,025 A | 12/1982 | Murch et al. |
| 4,791,146 A | 12/1988 | Tylenda |
| 4,803,220 A | 2/1989 | Brewster et al. |
| 4,803,229 A | 2/1989 | Narayan et al. |
| 4,950,694 A | 8/1990 | Hager |
| 5,006,569 A | 4/1991 | Stone |
| 5,089,534 A | 2/1992 | Thoen et al. |
| 5,132,334 A | 7/1992 | Gansen et al. |
| 5,232,956 A | 8/1993 | Gabbard et al. |
| 5,430,072 A | 7/1995 | Muller et al. |
| 5,436,277 A | 7/1995 | Narayan et al. |
| 5,459,221 A | 10/1995 | Narayan et al. |
| 5,491,176 A | 2/1996 | Huygens |
| 5,491,252 A | 2/1996 | Narayan et al. |
| 5,500,452 A | 3/1996 | Baker, Jr. et al. |
| 5,607,982 A | 3/1997 | Heyman et al. |
| 5,621,016 A | 4/1997 | Murty et al. |
| 5,674,920 A | 10/1997 | Obata et al. |
| 5,900,441 A | 5/1999 | De Witte et al. |

FOREIGN PATENT DOCUMENTS

| | | |
|---|---|---|
| EP | 0 284 253 | 9/1988 |
| EP | 0 359 456 | 3/1990 |

*Primary Examiner*—John M. Cooney, Jr.
(74) *Attorney, Agent, or Firm*—Nicole Graham

(57) ABSTRACT

Process for flexible polyurethane foam manufacture via separate and variable component mixing of at least 3 separate component streams, where at least one of the streams is TDI and one other stream is a preferred composition of MDI. Further provided is an empirical method for determining the level of TDI over a wide range of water levels and formulation compositional differences.

3 Claims, No Drawings

MANUFACTURE OF MDI-TDI BASED FLEXIBLE POLYURETHANE FOAMS

This application claims the benefit under 35 U.S.C. Section 119(e) of U.S. Provisional Application Ser. No. 60/222,446, filed Aug. 1, 2000, entitled "Manufacture of MDI-TDI Based Flexible Polyurethane Foams", the subject matter of which is herein incorporated by reference.

BACKGROUND OF THE INVENTION

TDI based polyurethane foams have been manufactured by the slabstock process for over 50 years. TDI has been the isocyanate of choice for this segment because it produces very low density foams and also a very wide range of foams with the proper selection of formulation components. There is one composition of TDI 8020 (80% 2,4'/20% 2,6') used for polyether flexible slabstock manufacture and TDI 6535 (65% 2,4'/35% 2,6') is sometimes blended with TDI 8020 for the manufacture of polyester slabstock. The two attributes that make TDI the material of choice for slabstock are its low density potential and very linear and predictable response in terms of density versus water level.

MDI based polyurethane foams have mainly served the rigid foam, elastomer, and molded flexible foam markets and has not significantly entered into the slabstock flexible market. While MDI flexible foams cannot make the good quality low density and soft foams that TDI is capable, MDI makes excellent medium to higher density both soft and hard foams. There are numerous commercial compositions of MDI for flexible foams, due to the necessity of changing its composition depending on both the formulation components and more importantly the water level. MDI compositions based on high levels of 4,4' MDI normally lead to foam collapse. It is well known in the art that foam process stability is achieved by increasing the level of 2,4' MDI and polyfunctional MDI species in the composition. It is also understood that the optimum 2,4' MDI level and overall MDI functionality is a direct function of the water content of the formulation. A given composition of MDI can only cover a moderate range of water levels, while still giving the desired performance processability (stable yet-open celled foam) and physical properties. Numerous MDI patents illustrate and explain the problems of making stable low density foams from all MDI and also attest to the need for using many compositions. See for example U.S. Pat. Nos. 4,365,025; 5,621,016; 5,089,534; and 5,491,252.

MDI isocyanates have not gained wide acceptance in the TDI slabstock market for two reasons: 1) It would require at least 2 and more likely 3 MDI product compositions to allow for on-the-fly adjustments to the isocyanate composition for varying flexible foam grades. The all-MDI approach would require multiple tank and metering installations for practical slabstock manufacture, making this approach very uneconomical and unwieldy compared to TDI; and 2) The complex non-linear behavior of MDI based flexible foam in regards to its density yield versus water content, makes it very difficult to make predictable adjustments.

MDI/TDI preblends have been widely used with good success in molded application areas and limited success to date in the slabstock area. There is much prior art covering the preparation, processing, and properties of MDI/TDI blends, but none address the issue of a single specific MDI composition blended with TDI to cover all grades and types of flexible polyether polyol based foams. See for example U.S. Pat. Nos. 3,492,251; 5,674,920; 5,132,334; 5,436,277; 5,459,221; 5,491,252; 5,607,982; 5,500,452; 5,232,956; and 4,803,220.

An improved process for the continuous or semi-continuous production of flexible foams, where MDI is the major component and TDI the minor component has now been found. This process substantially obviates the disadvantages described above and allows the use of certain preferred mixtures of diphenyl methane diisocyanates and oligomer polyphenyl-polymethylene polyisocyanates in combination with TDI 8020 or TDI 6535. Good quality, stable yet open celled foam, which does not collapse or shrink, can be achieved over a wide range of densities using a single MDI composition.

SUMMARY OF THE INVENTION

The present invention relates to a process for the preparation of flexible polyurethane foam using at least three reactive chemical component streams, wherein the components are fed separately to a mixing device; where at least one component consists essentially of a TDI series isocyanate composition and one component comprises predominantly (i.e., at least 50 weight percent) an MDI series isocyanate component (on a weight basis) and the third component may comprise polyol or another MDI or TDI. It is most preferred that the third component comprises a polyol component.

In an aspect of the invention, the overall isocyanate composition (sum of all isocyanate streams) comprises:

(I) 1 to 40% by weight of toluene dissocyanate and
(II) about 60 to 99% of a mixture of diphenylmethane diisocyanates and polyphenylmethylene polyisocyanates comprising:
  (1) 51 to 87% by weight of 4,4'-diphenylmethane dissocyanate
  (2) 0.5 to 16% by weight of 2,4'-diphenylmethane dissocyanate
  (3) 12.5 to 33% by weight of polyphenyl polymethylene polyisocyanates having 3 or more NCO groups per molecule, wherein the sum of (1),(2) and (3) total 100%.

A more preferred polyisocyanate mixture is one in which component (II) comprises:
  (1) 59 to 81% by weight of 4,4'-diphenylmethane dissocyanate
  (2) 1 to 13% by weight of 2,4'-diphenylmethane dissocyanate
  (3) 18 to 28% by weight of polyphenyl polymethylene polyisocyanates A most preferred polyisocyanate mixture is one in which component (II) comprises:
  (1) 65 to 81% by weight of 4,4'-diphenylmethane dissocyanate
  (2) 1 to 7% by weight of 2,4'-diphenylmethane dissocyanate
  (3) 18 to 28% by weight of polyphenyl polymethylene polyisocyanates In accordance with the invention the 2,4'-MDI content in isocyanate component (II) is low, so that, additional TDI from isocyanate stream (I) is necessary to achieve stable, yet open celled flexible foam. Addition of TDI improves the processing and physical properties of these predominantly MDI based foams compared to the alternative approach of using higher levels of 2,4' MDI.

An aspect of the invention is the complete control of the MDI/TDI blend ratio by separate metering to a mix device. Preblending or master blending of some of the TDI with the MDI is not the preferred method, but can be done when the MDI composition is extremely low in 2,4' MDI content, to improve the room temperature liquidity of the MDI composition.

In support of this invention, a new method for the determination of the level of TDI to be used with the particular MDI composition was devised. A guideline empirical calculation allows an overall stability factor to be calculated for any ratio of MDI/TDI. This stability factor for a given formulation is a function of the water level and needs to be increased with increasing water level. This method fulfills the need for making predominantly MDI based flexible polyurethane foams more predictable, like all-TDI based foams. Surprisingly, this empirical model is based on the premise that 2,4' MDI can be replaced with TDI (both 2,4' and 2,6' isomers) on an equivalent molar basis to achieve stable flexible foam.

This invention is directed mainly to flexible foam compositions that contain mainly MDI in the overall isocyanate composition. In this respect, it is a purpose of this invention to modify and improve the performance of predominantly MDI based flexible foams, then to make these hybrid MDI/TDI foams totally equivalent in performance to TDI based foams.

DETAILED DESCRIPTION OF THE INVENTION

The reactive chemical component streams used for the production of the flexible polyurethane foams according to the invention are described in detail. The overall isocyanate composition comprises at least 2 isocyanate streams (I) & (II) fed separately to a mixing device.

The isocyanate stream (I) can be any commercially available form of toluene diisocyanate (TDI). The most common to the ok slabstock industry is TDI 8020 (80% 2,4' and 20% 2,6 isomers), but TDI 6535 (65% 2,4' and 35% 2,6' isomers) is often blended with the TDI 8020 for polyester slabstock.

The isocyanate stream (II) is a specific mixture of diphenylmethane diisocyanate (MDI) and polyphenylmethane polyisocyanate (PMDI) commonly available. Suitable MDI's may be pure 4,4' MDI or mixtures of 4,4'-MDI and 2,4'-MDI isomers. Mixtures of MDI isomers will preferably contain less than 5% by weight of 2,2'-MDI. The PMDI consists of mixtures with diphenylmethane diisocyanate isomers, triisocyanates, and higher oligomers. Such PMDI's will contain from about 35 to 45% of MDI isomers, 15 to 25% triisocyanates and 35 to 50% by weight of higher oligomers (>3 functional).

The MDI and PMDI components described above are combined in a manner such that the isocyanate stream (II) comprises:

(1) 51 to 87% by weight of 4,4'-diphenylmethane dissocyanate (2) 0.5 to 16% by weight of 2,4'-diphenylmethane dissocyanate (3) 12.5 to 33% by weight of polyphenyl polymethylene polyisocyanates of NCO functionality of 3 or greater.

More preferably the isocyanate stream (II) comprises:

(1) 59 to 81% by weight of 4,4'-diphenylmethane dissocyanate (2) 1 to 13% by weight of 2,4'-diphenylmethane dissocyanate (3) 18 to 28% by weight of polyphenyl polymethylene polyisocyanates of NCO functionality of 3 or greater.

Most preferably the isocyanate stream (II) comprises:

(1) 65 to 81% by weight of 4,4'-diphenylmethane dissocyanate (2) 1 to 7% by weight of 2,4'-diphenylmethane dissocyanate (3) 18 to 28% by weight of polyphenyl polymethylene polyisocyanates of NCO functionality of 3 or greater.

The isocyanate stream (II) may optionally be further modified to contain urethane, allophanates, biurets, uretoniimine-carbodiimide, or isocyanaurate linkages. It should be understood that the compositional limitations of stream (II) as explained above do not include any of modified structures, but refer only to the percentage of base MDI structures as described.

The isocyanate stream (II) may be reacted with a polyhydroxy-containing polyol mainly for the purpose of improved liquidity (i.e. resistance to solidification at ambient temperature). Typically, the polyhydroxy-containing polyol will be a polyoxyalkylene polyether polyol, but polyester polyols are also within the scope of this invention. Diol or triols in the range of 500 to 3000 equivalent weight are most preferably used. The isocyanate blend may be reacted to free % NCO's of greater than 16% to 30%.

It is a most preferred aspect of the invention to maintain the isocyanate components (I) and (II) as separate streams for purposes of complete control of the mix ratio of the TDI(I) and MDI(II) streams. However, when the component (II) contains 7% or less of 2,4' MDI, then (II) may contain 5 to 10% of blended in TDI for purposes of improved product liquidity. This preblended level of TDI with the MDI must be taken into account, when determining the overall level of TDI in the formulation.

The invention provides a method for determining the proper amount of TDI (I) to be blended with the MDI component (II) in order to make stable, yet open celled flexible foam over a wide range of water levels. Due to the discovery that 2,4' MDI and TDI 8020 on a molar basis give about the same foam stability, an A empirical formula was derived for the purpose of foam stability prediction. The formula is referred to as the 'Isocyanate Asymmetry Factor' (IAF), since it calculates relative level of the diisocyanate structures (2,4'-MDI, 2,4'-TDI and 2,6'-TDI), which contribute to foam stability by disruption of the 4,4'-MDI polyurea hard block structure:

$$IAF = ((pbw\ 2,4'\text{-}MDI/125.2\ eq.wt.) + (pbw\ TDI/87\ eq.wt.)) \times 100/\text{Total NCO equiv.}$$

Where the Total NCO equivalents is the sum of the free NCO equivalents of all the isocyanate structures in the (I)+(II) isocyanate mixture including 2,4'-MDI, 4,4'-MDI, Poly-oligomeric MDI, 2,4'-TDI and 2,6'-TDI.

IAF can also be described as the Total Equivalents % of 2,4'-MDI plus TDI in the final MDI and TDI mixture.

The IAF values which give stable, yet open celled foam which does not collapse or shrink is a function of the overall formulation composition, polyol type and water level. Flexible foam stability is normally a continuum that operates over some range of composition variables. While the instability, perfect-stability or over-stability of a flexible foam is a function of many compositional variables including the type of polyols used, typical guideline IAF values versus water level are listed below:

| Water, pphp | Guideline IAF |
|---|---|
| 0.5–2.0 | 10–20 |
| 2.0–3.0 | 20–30 |
| 3.0–4.0 | 30–40 |
| 4.0–8.0 | 40–50 |

Increasing the level of TDI in the overall MDI-TDI composition or the combined (I) and (II) isocyanate streams, increases the IAF value. It has also been discovered that increasing IAF values lead to increased blowing efficiency—hence lower density foams and also softer foams. Due to the low 2,4' MDI levels allowed by this invention, the TDI level is of course the major player in foam softening and density reduction. Together the achievement of lower density stable yet open celled foams and also softer foams by this invention provides a novel way of achieving varying grades of foam (i.e. density and hardness) that are required by the slabstock process. The variation of foam grades can be achieved on-the-fly by simple adjustment of the isocyanate stream ratio of (I) to (II).

The invention is primarily directed to the continuous slabstock processes including: maxfoam, conventional pouring, vertifoam, variable pressure foaming, Cardio and other liquid CO2 processing equipment. This invention is not limited to only slabstock and can also be applied to other polyurethane processes. Such processes may be continuous, semi-continuous or batch like reaction injection molding (RIM) of flexible foam, microcellular elastomers, semi-rigid foams and rigid foams. Fully continuous slabstock processes are, however, the most preferred embodiment of this invention.

The separate isocyanate streams (I) and (II) employed in the invention are provided to a mixing device and reacted with a polyol stream (stream III) and any other desirable flexible foam additive streams for producing a flexible polyurethane foam. In one aspect of the invention, as many as 50 streams are utilized. In one embodiment, a polyhydroxy polyol may be used for reacting with the isocyanate streams. Generally, such polyhydroxy polyol has an equivalent weight of about 500 to about 3000 and an ethylene oxide content of less than about 30%. Preferably the equivalent weight is about 1000 to about 2000, more preferably about 1500 to about 2500, and the polyol (or polyol blend) has a functionality of about 2 to about 4, preferably about 2.5 to about 3. Equivalent weight, as is known in the art, is determined from the measured hydroxyl number. Hydroxyl number is the number of milligrams of potassium hydroxide required for complete hydrolysis of the fully acetylated derivative prepared from one gram of polyol.

Polyols which can be utilized in the present invention include both polyether and polyester polyols. Polyether polyols which may be employed include, for example, those based on:

(1) alkylene oxide adducts of polyhydroxyalkanes;
(2) alkylene oxide adducts of nonreducing sugars and sugar derivatives;
(3) alkylene oxide adducts of polyphenols;
(4) alkylene oxide adducts of polyamines and polyhydroxyamines; and
(5) alkylene oxide adducts of phosphorus and polyphosphorus acids.

Suitable poly (alkylene oxide) polyols include those of the HR or high reactivity types and conventional low reactivity types, as so designated by the slabstock industry. Such polyols have an average (nominal) functionality of 2 or greater and an equivalent weight of about 500 to about 2500. More preferably, the poly (alkylene oxide) polyols have an average functionality of about 2 to 3, an equivalent weight of about 1000 to 2500. HR type polyols have greater than about 60% primary hydroxyl functionality, and an ethylene oxide content of less than about 30% by weight. More preferably the HR polyols have greater than about 75% primary hydroxyl functionality and less than about 25% by weight ethylene oxide, and particularly below about 20% by weight ethylene oxide. Conventional slabstock polyols have essentially >99% secondary hydroxyl functionality. Such polyols comprise about 5% to 15% of ethylene oxide mixed into the polyoxypropylene chain.

Suitable polyols of alkylene oxide adducts of polyhydroxyalkanes include the alkylene oxide adducts of glycerine, 1,2,4-trihydroxybutane, 1,2,6-trihydroxyhexane, 1,1,1-trimethylolethane, 1,1,1-trimethylopropane, pentaerythritol, xylitol, arabitol, sorbitol, mannitol, and the like.

Suitable alkylene oxide adducts of nonreducing sugars and sugar derivatives include sucrose, alkyl glycosides such as methyl glucoside, ethyl glucoside, and the like; glycol glycosides such as ethylene glycol glycoside, propylene glycol glycoside, glycerol glucoside, 1,2,6-hexanetriol glycoside, and the like.

Suitable polyols of alkylene oxide adducts of polyphenols include alkylene oxide adducts of the condensation products of phenol and formaldehyde, adducts of novolac resins and adducts of bisphenols such as bisphenol-A. Also suitable are alkylene oxide adducts of 1,2,3-tris(hydroxyphenyl) propane and of 1,1,2,2-tetrakis(hydroxylphenol)ethanes, and the like.

Other suitable polyols include graft polyols, such as a polyether triol in which vinyl monomers are graft copolymerized. Styrene and acrylonitrile are the usual vinyl monomers of choice. The second type, a polyurea modified polyol, is a polyol containing a polyurea dispersion formed by the reaction of a diamine and TDI. Since TDI is used in excess, some of the TDI may react with both the polyol and the diamine. A third type is a polyisocyanate poly-addition product formed from a dispersion in a base polyol of glycol and amino-polyols reacted with MDI or TDI.

Suitable polyols, which are alkylene oxide adducts of polyamines and polyhydroxyamines include ethylenediamine, propylenediamine, monoethanolamine, diethanolamine, triethanolamine, diisopropanolamine, diethanolmonoisopropanolamine, and the like.

Suitable polyols which are alkylene oxide adducts of phosphorus and polyphosphorus acids include adducts of phosphoric acid, phosphorus acid, alkyl phosphonic acids, and the like.

The most preferred alkylene oxides are propylene oxide and ethylene oxide.

Polyester polyols which may be employed include, for example, those prepared by reacting a polycarboxylic acid or anhydride with a polyhydric alcohol. The polycarboxylic acids may be aliphatic, cycloaliphatic, aromatic and/or heterocyclic and may be substituted (e.g., with halogen atoms) and/or unsaturated. Examples of suitable carboxylic acids and anhydrides include succinic acid; adipic acid; suberic acid; azelaic acid; sebacic acid; phthalic acid; isophthalic acid; terephthalic acid; trimellitic acid; phthalic acid anhydride; tetrahydrophthalic acid anhydride; hexahydrophthalic acid anhydride; tetrachlorophthalic acid anhydride; endomethylene tetrahydrophtalic acid anhydride; glutaric acid anhydride; maleic acid; maleic acid anhydride; fumaric acid; and dimeric and trimeric fatty acids, such as those of oleic acid, which may be in admixture with monomeric fatty acids. Simple esters of polycarboxylic acids may also be used, such as terephthalic acid dimethyl ester, terephthalic acid bisglycol ester and mixtures thereof.

Crosslinkers and chain extenders can be included with the polyol. Suitable crosslinkers and chain extending agents include compounds which are reactive with isocyanate groups, particularly compounds which have hydroxyl and/or primary or secondary amine groups including: (1) tri or higher functional crosslinking compounds with an equivalent weight less than about 200 and (2) difunctional chain extender compounds, with an equivalent weight less than about 100. Preferably, the crosslinkers and chain extending agents are predominantly primary hydroxyl terminated.

Suitable cross-linking agents include glycerol, oxyalkylated glycerol, pentaerythritol, sucrose, trimethylolpropane, sorbitol, oxyalkylated polyamines, and alkanolamines. The functionality of the cross-linking agents may range from about 3 to about 8, preferably about 3 to about 4, and the number average molecular weight may vary from about 62 to about 750.

Preferred crosslinking agents include oxypropylated derivatives of glycerol having a number average molecular weight of about 200 to about 750, glycerol and mixtures thereof. Other preferred crosslinking agents include diethanolamine and triethanolamine.

Suitable chain extenders have a number average molecular weight less than about 750, preferably about 62 to about 750, and a functionality of about 2. These chain extenders may be selected from polyols such as ethylene glycol, diethylene glycol, butanediol, dipropylene glycol and tripropylene glycol; aliphatic and aromatic diamines, such as 4,4'-methylene dianilines having a lower alkyl substituent positioned ortho to each N atom; and certain imino-functional compounds such as those disclosed in European Patent Applications Nos. 284 253 and 359 456, and certain enamino-functional compounds such as those disclosed in European Patent Application No. 359 456 having 2 isocyanate-reactive groups per molecule.

The crosslinkers and chain extenders, when used, may be used in an amount of between about 0.1 and 5 parts by weight, preferably between 0.5 and 2 parts by weight per 100 parts of the polyol component.

Surfactants can be included with the polyol component and/or the isocyanate. Silicone surfactants widely used in the polyurethane foam industry, especially those used for conventional (flexible), semi-rigid, rigid, and polyester-based polyurethane foam production, may be employed. Included within the class of such surfactants are organopolysiloxane polymers and copolymers, the most common ones being the polysiloxane-polyoxyalkylene copolymers wherein the polysiloxane contains greater than about ten silicon atoms. Examples of surfactants which may be employed include TEGOSTAB® B 4690 from Goldschmidt. Such surfactants may be employed in amounts of about 0.2 percent up to about 1.0 percent by weight, based on the total reaction it mixture.

Catalysts may also be included with the polyol. Useful catalysis include tertiary amine and organometallic polyurethane catalysts. The catalysts are used in amounts necessary for a particular foam as will be evident to one skilled in the art. Typical amounts are from about 0.05 to 1.0 percent based on the combined weight of the A-side (isocyanates) and the B-side (polyol and formulation additives).

Suitable tertiary amine catalysts include: bis(2,2'-dimethylaminoethyl)ether, trimethylamine, N-methylmorpholine, N-ethylmorpholine, N,N-dimethylbenzylamine, N,N-dimethylethanolamine, N,N,N', N'-tetramethyl-1,3-butanediamine, pentamethyldipropylenetriamine, triethylenediamine, pyridine oxide and the like.

Suitable organometallic catalysts include salts of organic acids with metals such as alkali metals, alkaline earth metals, Al, Sn, Pb, Mn, Co, Bi, and Cu, including, for example, sodium acetate, potassium laurate, calcium hexanoate, stannous acetate, stannous octoate, stannous oleate, lead octoate, metallic driers such as manganese and cobalt napthenate, and the like; and organometallic derivatives of tetravalent tin, trivalent and pentavalent As, Sb, and Bi, and metal carbonyls of iron and cobalt. Organotin compounds are preferred metal catalysts. Examples of organotin compounds include dialkyltin salts of carboxylic acids, e.g., dibutyltin diacetate, dibutyltin dilaurate, dibutyltin maleate, dilauryltin diacetate, dioctyltin diacetate, dibutyltin-bis(4-methylaminobenzoate), dibuytyltin dilaurylmercaptide, dibutyltin-bis(6-methylaminocaproate), trialkytin hydroxide, dialkytin oxide, dialkyltin dialkoxide, or dialkyltin dichloride, trimethyltin hydroxide, tributyltin hydroxide, trioctyltin hydroxide, dibutyltin oxide, dioctyltin oxide, dilauryltin oxide, dibutyltin-bis(isopropoxide), dibutyltin-bis(2-dimethylaminopentylate), dibutyltin dichloride, dioctyltin dichloride, and the like.

Other known polyurethane catalysts can be used in combination with the amine and organometallic catalysts described above. For example, strong bases such as alkali and alkaline earth metal hydroxides, alkoxides, and phenoxides; acidic metal salts of strong acids such as ferric chloride, stannous chloride, antimony trichloride, bismuth nitrate and chloride, and the like; chelates of various metals such as those which can be obtained from acetylacetone, benzoylacetone, trifluoroacetylacetone, ethyl acetoacetate, salicylaldehyde, cyclopentanone-2-carboxylate, acetylacetoneimine, bis-acetylacetonealkylenediimines, salicyladehydeimine, and the like, with the various metals such as Be, Mg, Zn, Cd, Pb, Ti, Zr, Sn, As, Bi, Cr, Mo, Mn, Fe, Co, Ni, or such ions as $MoO_2^{++}$, $UO_2^{++}$, and the like; alcoholates and phenolates of various metals such as $Ti(OR)_4$, $Sn(OR)_4$, $Sn(OR)_2$, $Al(OR)_3$, and the like, wherein R is an alkyl or aryl, and the reaction products of alcoholates with carboxylic acids, beta-diketones, and 2(N,N-dialkylamino)alkanols, such as the well known chelates of titanium obtained by this or equivalent procedures; all can be employed in the process of the present invention.

Blowing agents may also be included with the polyol component. Suitable blowing agents include reactive blowing agents such as water; and physical blowing agents such as liquefied gases such as nitrogen, carbon dioxide, and air; chlorofluorocarbons and hydrocarbons; chemical blowing agents, such as hydroxyfunctional cyclic ureas, physical polyurethane blowing agents such as methylene chloride, acetone, and pentane. Still other chemical blowing agents include thermally unstable compounds, which liberate gases upon heating such as N,N'-dimethyl-N,N'-dinitrosoterephthalamide. Water is the most preferred blowing agent, as it also generates the polyureas making up the hard segments of the flexible foam.

The blowing agents may be used in amounts up to about 15%, preferably about 10 to about 5%, more preferably about 5% to about 0.5% based on the total weight of the B-side. The amount of blowing agent will vary with factors such as the density desired in the foamed product. Water is preferably used as the sole blowing agent in an amount from about 0.5% up to about 8.0% based on the total weight of the B-side.

A variety of additional additives known to those skilled in the art also may be included in the A-side or B-side, preferably the B-side. These additives include flame retardants, colorants, mineral fillers, and other materials.

Suitable additives which may be included in the B-side include, for example, conventional additives such as colorants and flame retardants. Useful flame retardants include organic phosphonates, phosphites and phosphates such as tris-2-chloroisopropyl) phosphate (TCPP), dimethyl methyl phosphonate, and various cyclic phosphates and phosphonate esters known in the art; halogen-containing compounds known in the art such as brominated diphenyl ether and other brominated aromatic compounds; melamine; antimony oxides such as antimony pentoxide and antimony trioxide; zinc compounds such as zinc oxide; aluminum compounds such as alumina trihydrate; and magnesium compounds such as magnesium hydroxide and inorganic phosphorus compounds such as ammonium polyphosphate. The flame retardants may be used in any suitable amount which will be evident to those skilled in the art. For example, the flame retardants may be used in an amount of 0 to 55% based on the total weight of the B-side. Other conventional additives generally used in the art may also be used in the B-side. Examples of these additives include fillers such as calcium carbonate, silica, mica, wollastonite, wood flour, melamine, glass or mineral fibers, glass spheres, etc.; pigments; surfactants; and plasticizers. Such additives can be used in amounts which will be evident to one skilled in the art from the present disclosure.

The invention will now be illustrated by reference to the following non-limiting examples wherein all amounts, unless otherwise specified, are parts by weight.

| Glossary | |
|---|---|
| 1. TEGOSTAB ® B 4690 | is a polydimethylsiloxane surfactant from Goldschmidt. |
| 2. DABCO ® 33LV is | is 33% triethylene diamine in dipropylene glycol available from Air Products |
| 3. DPG | is dipropylene glycol from Quaker City |
| 4. NIAX ® A-1 | is 70% bis-(2-dimethylaminoethyl) ether in dipropylene glycol from Witco-O.S.I. Corp. |
| 5. NIAX ® C-183 | is 75% Dabco 33LV and 25% Niax A-1 from Witco-O.S.I. Corp. |
| 6. PLURACOL ® 1117 | is a polyether HR graft polyol of 25 OH# and about 14% SAN solids from BASF Corporation. |
| 7. R7300 | is about a 2.2 functionality MDI isocyanate prepolymer with 26.0% NCO from Huntsman Polyurethanes |
| 8. R8700 | is about a 2.7 functional polymeric MDI with 31.5% NCO from Huntsman Polyurethanes |
| 9. RUBINOL ® F428 | is a nominal 6000 MW polyether triol of 28 OH# from Huntsman Polyurethanes |
| 10. TDI 8020 | is 80% 2,4' TDI/20% 2,6' TDI from Huntsman Polyurethanes |
| 11. T-9 | is stannous octoate, tin catalyst from Air Products Corp. |

EXAMPLES

In the non-limiting examples, which follow, the foam properties are evaluated according to the following test methods:

| Property | Method |
|---|---|
| Density, Kg/m³ | ASTM D 3574-91-A |
| % Blowing efficiency | FORMCALC ©[1] formula |
| IFD: 4 ˋASTM (N) 25% | ASTM D 3574-91-B |
| IFD: 4 ˋASTM (N) 65% | ASTM D 3574-91-B |
| IFD: 4 ˋASTM (N) sag | ASTM D 3574-91-B (65% IFD)/(25% IFD) |
| % Recovery | ASTM D 3574-91-B (25% IFD return)/(25% IFD initial) |
| Ball Rebound | ASTM D 3574 91 H |
| Tensile, Kpa | ASTM D 3574 91 E |
| % Elongation | ASTM D 3574 91 E |
| Tear, N/m | ASTM D 3574 91 F |
| 90% C.S. (thickness) | ASTM D 3574 91 D |
| 75% C.S. (thickness) | ASTM D 3574-91-D |
| 75% HACS J1 (thickness) | ASTM D 3574 91 D/J |
| 50% CFD, N | ASTM D 3574-C |
| Normalized Hardness or Polymer Hardness | dividing the 50% CFD or 25% IFD values by the density squared. |

[1]Proceedings of the Technical Program—Polyurethane Foam Association, Williamsburg, Virginia, October, 1998.

In the non-limiting examples below, various amounts of TDI are blended with MDI to produce an MDI-TDI blend for use as the isocyanate component. The MDI-TDI isocyanate component then is reacted with the polyol and additive components, required for a flexible foam composition. The polyol and total additive components together are sometimes referred to as the B-side.

The polyurethane foams of examples 1–16 of Tables 1 & 2 and examples 28–33 of Table 5 are prepared by hand mixing of the ingredients set forth at ambient temperature. In preparation of the B-side polyol component, RUBINOL® F428 polyol, TEGOSTAB® B 4690 surfactant, and the NIAX® C-183 or other optional amine catalysts are weighed into a 2 liter container. The T-9 tin catalyst is added and then the preblended MDI/TDI isocyanate composition is rapidly added to the B-side polyol component. Mixing is immediately initiated with simultaneous addition of water by syringe. A 3" high shear Conn & Company mix blade is run at about 2400 rpm to accomplish homogenous mixing. After 10 seconds of mixing time, the resulting foam mixture is rapidly poured into an 8 liter polyethylene payliner (container). The foaming reaction proceeded and the foam is allowed to free rise. The foams are cured for a minimum of 24 hours at room temperature before being cut and tested according to ASTM D 3574-91.

The polyurethane foams of examples 17–27 in Tables 3 and 4 were prepared on a small scale multi-component Martin Sweets machine. The MDI and TDI are metered separately, in duplication of the preferred process mode of the invention, so that different levels of TDI with the MDI can be easily adjusted as required by the formulation. A total formulation output of about 30 lbs/min is metered to a 300 cc free volume pin mixer operating at 4000 rpm to provide a homogeneous high quality mix. Box foams of 20 inch by 20 inch by 20 inch are poured at 25° C. and allowed to free rise. The box foams are cured a minimum of 24 hours at room temperature and then foam samples are cut for physical testing according to ASTM D3574-91. The properties of the foams are shown in Tables 3A and 4A.

The flexible foam examples of Tables 1 and 2 illustrate the wide range of foam hardness and densities which can be achieved with increasing amounts of TDI with MDI. The examples of Table 1 and Table 2 are handmix comparisons, which are respectively within the preferred MDI compositional range (high 4,4' MDI in Table 1) and outside the preferred MDI compositional range (high 2,4' MDI in Table 2). Tables 3 and 4 are machine prepared foams using an MDI composition within the scope of this invention. Table 3 presents low water level latex-like foams which use low amount levels of additional TDI for production of stable yet-open foam. Table 4 shows medium density high resilient (HR) foams at higher water levels. Table 4 illustrates use of higher amounts of additional TDI for both foam stability and improvements in foam resilience (ball rebound), as well as elongation and tear. Table 5 presents comparisons of all-MDI formulations and the novel MDI/TDI formulations of the invention, which show significant improvements in resilience, tensile strength, and tear strength.

Tables 1 and 1A present examples within the scope of this invention, where essentially all 4,4'MDI is used for the isocyanate prepolymer. In the examples of Table 1, an isocyanate prepolymer designated as MDI-A is employed. The base MDI composition of MDI-A is 78% 4,4'-MDI, 0.8% 2,4'-MDI and 21.2% poly-oligomeric MDI ($\geq 3$ NCO's per molecule). MDI-A prepolymer has a %NCO= 28.4 and an average functionality of 2.19. MDI-A prepolymer is prepared by reacting 58 pbw of 4,4 MDI with 12 pbw of RUBINOL® F428 polyol. The prepolymer then is blended with 30 pbw of polymeric MDI (average functionality of 2.7). The MDI-A isocyanate prepolymer is blended with TDI at the levels LS identified in Table 1 and foams are prepared at about a constant 30% polyurea hard block level per Formcalc® in an HR type flexible formulation.

In Table 1A, the foams of examples 1 and 3, at 17% and 20% TDI, respectively, are unstable and require addition of the cross linker, glycerine, as shown in examples 2 and 4. Examples 5–8 covering 20% to 50% by weight TDI are fully stable. As shown in Tables 1 and 1A, various foam grades of varying density and hardness can be made by blending TDI into a preferred MDI composition. Varying grades of free rise foam are achieved by density reduction of up to about 25% and by foam polymer softening (i.e. the normalized hardness) up to about 50% with increasing levels of TDI. Excellent ball rebounds of 63% to 66% are achieved indicating a high degree of resiliency. IAF values of about 26 to 63% are calculated for examples 1–8 in Table 1A. For this formulation an IAF value of about 35 is necessary for stable non-collapsing foam.

TABLE 1

| Example/Component | 1 | 2 | 3 | 4 | 5 | 6 | 7 | 8 |
|---|---|---|---|---|---|---|---|---|
| ISOCYANATE BLEND: | | | | | | | | |
| MDI-A Prepolymer | 56.29 | 61.26 | 53.86 | 57.21 | 49.95 | 46.39 | 40.77 | 31.49 |
| TDI 8020 | 11.53 | 12.55 | 13.46 | 14.30 | 16.65 | 19.88 | 23.94 | 31.49 |
| wt. % TDI of MDI + TDI Blend | 17 | 17 | 20 | 20 | 25 | 30 | 37 | 50 |
| Index | 100 | 100 | 100 | 100 | 100 | 100 | 100 | 100 |
| B-side | | | | | | | | |
| RUBINOL ® F 428 | 100 | 100 | 100 | 100 | 100 | 100 | 100 | 100 |
| NIAX ® C 183 | 0.3 | 0.3 | 0.3 | 0.3 | 0.3 | 0.5 | 0.5 | 0.5 |
| T-9 | 0.25 | 0.25 | 0.25 | 0.25 | 0.25 | 0 | 0 | 0 |
| Glycerine[1] | 0 | 1.4 | 0 | 1 | 0 | 0 | 0 | 0 |
| TEGOSTAB ® B 4690 | 1 | 1 | 1 | 1 | 1 | 1 | 1 | 1 |
| Water | 4.18 | 4.18 | 4.23 | 4.23 | 4.32 | 4.42 | 4.51 | 4.72 |

[1] 99% Pure glycerine

TABLE 1A

| Example/Property | 1 | 2 | 3 | 4 | 5 | 6 | 7 | 8 |
|---|---|---|---|---|---|---|---|---|
| Density kg/m$^3$ | Foam Collapsed | 31.72 | Foam Collapsed | 30.91 | 29.95 | 26.27 | 24.99 | 23.55 |
| Reduction in Density, %** | — | Reference | — | 2.6 | 5.6 | 17.2 | 21.2 | 25.8 |
| 50% CFD, N | — | 9.35 | — | 8.46 | 6.23 | 5.34 | 3.12 | 2.67 |
| 50% CFD/Density$^2$ × 10$^3$ | — | 9.3 | — | 8.9 | 7.0 | 7.7 | 5.0 | 4.8 |
| Drop in polymer hardness, %*** | — | Reference | — | 4.3 | 24.7 | 17.2 | 46.2 | 48.4 |
| Ball rebound, % | — | 63 | — | 63 | 63 | 66 | 65 | 64 |
| MW/Crosslink-Mc | 4067 | 2922 | 4205 | 3253 | 4451 | 4728 | 5170 | 6220 |
| Equiv. % TDI of ISO blend | 25.65 | 25.65 | 29.63 | 29.63 | 35.96 | 41.92 | 49.73 | 62.75 |
| Equiv. 2,4' MDI of ISO blend | 0.59 | 0.59 | 0.56 | 0.56 | 0.51 | 0.46 | 0.40 | 0.30 |

TABLE 1A-continued

| Example/Property | 1 | 2 | 3 | 4 | 5 | 6 | 7 | 8 |
|---|---|---|---|---|---|---|---|---|
| IAF*-Isocyanate Asymmetry Factor | 26.24 | 26.24 | 30.16 | 30.19 | 36.47 | 42.38 | 50.13 | 63.05 |

*IAF = Equiv. % TDI + Equiv. 2,4' MDI in ISO blend

**Reduction in Density, $$\% = \frac{(\text{Density of Example} - \text{Density of Reference}) \times 100}{\text{Density of Reference}}$$

***Drop in polymer hardness, $$\% = \frac{(50\% \text{ CFD}/\text{Density}^2 \text{ of Example} - 50\% \text{ CFD}/\text{Density}^2 \text{ of Reference}) \times 100}{50\% \text{ CFD}/\text{Density}^2 \text{ of Reference}}$$

In Tables 2 and 2A, examples 9–16 illustrate MDI compositions having high amounts of 2,4' MDI, which are outside the scope of this invention. The isocyanate component used in the examples of Table 2 is an isocyanate prepolymer designated as MDI-C. The MDI compositional basis for MDI-C prepolymer is 60.8% 4,4'-MDI, 22.6% 2,4'-MDI and 16.6% poly-oligomeric MDI ($\geq 3$ NCO's per molecule). MDI-C prepolymer has a 28.6% NCO and an average functionality of 2.14. MDI-C prepolymer is prepared by reacting 64.5 pbw of 30%/70% 2,4'-/4,4' MDI with 12 pbw of RUBINOL® F428 polyol, and then blending it with 23.5 pbw of polymeric MDI (2.7 functionality). Since the MDI composition has a high 2,4' MDI content, the amount of TDI used to yield about the same IAF is much less than the amounts of TDI used in the examples of Tables 1 & 1A. The IAF values are respectively about the same for the high 4,4' MDI series and the foam performance in terms of collapse or stability and density is also about the same.

The physical properties of the foams of Table 2 are shown in Table 2A. These foams have much lower resilience (ball rebound), though, about the same relationship of decreasing hardness with increasing IAF. This data shows that it is much preferred to achieve a given IAF value by use of higher levels of TDI in combination with an MDI composition very high in 4,4' MDI, rather than high in 2,4' MDI.

TABLE 2

| Example/Component | 9 | 10 | 11 | 12 | 13 | 14 | 15 | 16 |
|---|---|---|---|---|---|---|---|---|
| ISOCYANATE BLEND: | | | | | | | | |
| MDI-C Prepolymer | 68.62 | 76.82 | 64.62 | 68.00 | 61.12 | 56.35 | 49.91 | 39.27 |
| TDI 8020 | 1.70 | 1.91 | 4.86 | 5.12 | 7.63 | 11.54 | 16.64 | 25.10 |
| wt. % TDI of MDI + TDI Blend | 2.42 | 2.42 | 7 | 7 | 11.1 | 17 | 25 | 39 |
| Index | 100 | 100 | 100 | 100 | 100 | 100 | 100 | 100 |
| B-side | | | | | | | | |
| RUBINOL ® F 428 | 100 | 100 | 100 | 100 | 100 | 100 | 100 | 100 |
| NIAX ® C 183 | 0.3 | 0.3 | 0.3 | 0.3 | 0.3 | 0.5 | 0.5 | 0.5 |
| T-9 | 0.25 | 0.25 | 0.25 | 0.25 | 0.25 | 0 | 0 | 0 |
| Glycerine[1] | 0 | 1.8 | 0 | 0.8 | 0 | 0 | 0 | 0 |
| TEGOSTAB ® B 4690 | 1 | 1 | 1 | 1 | 1 | 1 | 1 | 1 |
| Water | 3.94 | 3.94 | 4.02 | 4.02 | 4.09 | 4.2 | 4.33 | 4.55 |

[1]99% Pure glycerine

TABLE 2A

| Example/Property | 9 | 10 | 11 | 12 | 13 | 14 | 15 | 16 |
|---|---|---|---|---|---|---|---|---|
| Density kg/m$^3$ | Foam Collapsed | 34.60 | 45.01 | 34.60 | 32.20 | 28.83 | 28.67 | 24.83 |
| Reduction in Density, %* | — | Reference | — | 0.0 | 6.9 | 16.7 | 17.1 | 28.2 |
| 50% CFD, N | — | 11.57 | 1" recession | 10.68 | 7.57 | 5.34 | 4.9 | 2.67 |
| 50% CFD/Density$^2 \times 10^3$ | — | 9.7 | — | 8.9 | 7.3 | 6.4 | 6.0 | 4.3 |
| Drop in polymer hardness, %** | — | Reference | — | 11.2 | 24.7 | 34.0 | 38.0 | 55.7 |
| Ball rebound, % | — | 48 | — | 55 | 60 | 62 | 60 | 65 |

TABLE 2A-continued

| Example/Property | 9 | 10 | 11 | 12 | 13 | 14 | 15 | 16 |
|---|---|---|---|---|---|---|---|---|
| MW/Crosslink-Mc | 4304 | 2840 | 4496 | 3605 | 4682 | 4986 | 5417 | 6397 |
| Equiv. % TDI of ISO blend | 4.00 | 4.00 | 11.19 | 11.19 | 17.30 | 25.53 | 35.81 | 51.69 |
| Equiv. % 2,4' MDI of ISO blend | 22.20 | 22.20 | 20.54 | 20.54 | 19.12 | 17.22 | 14.84 | 11.17 |
| IAF-Isocyanate Asymmetry Factor | 26.20 | 26.20 | 31.73 | 31.73 | 36.42 | 42.75 | 50.65 | 62.86 |

*Reduction in Density, $$\% = \frac{(\text{Density of Example} - \text{Density of Reference}) \times 100}{\text{Density of Reference}}$$

**Drop in polymer hardness, $$\% = \frac{(50\% \text{ CFD}/\text{Density}^2 \text{ of Example} - 50\% \text{ CFD}/\text{Density}^2 \text{ of Reference}) \times 100}{50\% \text{ CFD}/\text{Density}^2 \text{ of Reference}}$$

In examples 17–21 of Tables 3 and 3A, foams at low water levels (1.5–1.65 pbw) corresponding to about 15% polyurea hard block in the final foam, are prepared. At these water levels, the MDI-D prepolymer has sufficient stability to produce an acceptable foam without addition of TDI. However, the addition of TDI serves to lower the free rise density and soften the foam.

In preparing the foams of Table 3, an isocyanate prepolymer designated MDI-D having a % NCO of 28.7% and a functionality of about 2.16 is employed. MDI-D is prepared by reacting 61.4 pbw of 15%/85% 2,4'/4,4' MDI with 11.8 pbw of RUBINOL® F428 polyol and then blending the resulting MDI prepolymer with 26.8 pbw of polymeric MDI. The MDI composition for MDI-D prepolymer is 69.9% 4,4'-MDI, 11.1% 2,4'-MDI and 19.0% poly-oligomeric MDI (>3 NCO's per molecule). The MDI-D prepolymer and TDI 8020 is metered separately on a multi-component Martin Sweets machine and only low levels of TDI were needed correspondingly with the low water level to make stable yet-open higher density flexible foams. IAF values of 11.5 to 31.6 all made acceptable foam; however, IAF values above 20 were necessary for high ball rebounds >60.

TABLE 3

| Example/Component | 17 | 18 | 19 | 20 | 21 |
|---|---|---|---|---|---|
| ISOCYANATE BLEND: | | | | | |
| MDI-D Prepolymer | 32.24 | 31.23 | 30.23 | 28.27 | 25.86 |
| TDI 8020 | 0.00 | 0.80 | 1.59 | 3.14 | 4.56 |
| wt. % TDI of MDI + TDI Blend | 0 | 2.5 | 5 | 10 | 15 |
| Index | 102 | 102 | 102 | 102 | 102 |
| B-side | | | | | |
| PLURACOL ® 1117 | 100 | 100 | 100 | 100 | 100 |
| NIAX ® C 183 | 0.23 | 0.23 | 0.23 | 0.23 | 0.23 |
| T-9 | 0.25 | 0.25 | 0.25 | 0.25 | 0.25 |
| TEGOSTAB ®B 4690 | 1 | 1 | 1 | 1 | 1 |
| Water | 1.52 | 1.54 | 1.56 | 1.60 | 1.64 |

TABLE 3A

| Example/Property | 17 | 18 | 19 | 20 | 21 |
|---|---|---|---|---|---|
| Density kg/m³ | 98.2 | 92.3 | 87 | 76 | 69.6 |
| Reduction in Density, %* | Reference | 6.0 | 11.4 | 22.6 | 29.0 |
| % Blowing Efficiency | 55.2 | 57.9 | 60.5 | 67.2 | 71.3 |
| Ball rebound, % | 55 | 56 | 56 | 62 | 65 |
| Tensile, Kpa | 184.2 | 182.2 | 173.2 | 142.8 | 120.1 |
| % Elongation | 98 | 116 | 118 | 116 | 119 |
| Tear, N/M | 306.9 | 298.2 | 315.7 | 272.10 | 251.1 |
| 90% C.S. (Thickn.) | 2.7 | 3 | 2.5 | 3 | 2.8 |
| 75% C.S. (Thickn.) | 2.7 | 2.7 | 3 | 3 | 2.8 |
| MW/Crosslink-Mc | 3983 | 4038 | 4094 | 4208 | 4326 |
| Equiv. % TDI of MDI + TDI blend | 0 | 4.11 | 8.08 | 15.66 | 22.78 |
| Equiv. % 2,4' MID of MDI + TDI blend | 11.53 | 10.96 | 10.5 | 9.64 | 8.82 |
| IAF-Isocyanate Asymmetry Factor | 11.53 | 15.07 | 18.58 | 25.3 | 31.61 |
| Drop in polymer hardness, %** | Reference | 1.1 | 1.6 | 6.1 | 15.4 |
| 25% IFD/Density² × 10² | 5.73 | 5.67 | 5.64 | 5.38 | 4.85 |
| 25% IFD, N | 553 | 483 | 427 | 311 | 235 |
| Support Factor | 2.8 | 265 | 263 | 258 | 256 |
| % Recovery | 85.8 | 86.5 | 86.6 | 87.1 | 88.1 |

*Reduction in Density, $$\% = \frac{(\text{Density of Example} - \text{Density of Reference}) \times 100}{\text{Density of Reference}}$$

**Drop in polymer hardness, $$\% = \frac{(50\% \text{ CFD}/\text{Density}^2 \text{ of Example} - 50\% \text{ CFD}/\text{Density}^2 \text{ of Reference}) \times 100}{50\% \text{ CFD}/\text{Density}^2 \text{ of Reference}}$$

In examples 22–27 of Tables 4 and 4A, foams are prepared with MDI-D prepolymer and increasing levels of TDI 8020, but at 2.9 pbw water level. TDI amounts of 16% to 22.5% by weight were necessary to make stable yet-open cell foam and affect grade changes to lower density and make softer foams. The foams are machine prepared as in examples 17–21 of Table 3.

The properties of the foams are shown in Table 4A. As shown in Table 4A, over the range of TDI employed, the free rise density is reduced by about 20% and the polymer hardness (normalized hardness) is reduced by about 26% as the TDI level increases. IAF values of about 33 to 40 were necessary for this higher water series of foams. The physical properties are very good at these high levels of blended in TDI. These results once again support an MDI composition high in 4,4' MDI and very low in 2,4' MDI. Especially notable is the 300 to 320 N/m tear strength which is not possible to achieve with all-MDI based foams. All the foams were highly resilient with ball rebounds of 58 to 63.

TABLE 4

| Example/Component | 22 | 23 | 24 | 25 | 26 | 27 |
|---|---|---|---|---|---|---|
| ISOCYANATE BLEND: | | | | | | |
| MDI-D Prepolymer | 42.32 | 41.67 | 40.06 | 39.33 | 38.60 | 37.53 |
| TDI 8020 | 8.06 | 8.863 | 9.40 | 9.83 | 10.26 | 10.89 |
| wt. % TDI of MDI + TDI Blend | 16 | 17.5 | 19 | 20 | 21 | 22.5 |
| Index | 102 | 102 | 102 | 102 | 102 | 102 |
| B-side | | | | | | |
| PLURACOL ® 1117 | 100 | 100 | 100 | 100 | 100 | 100 |
| NIAX ® C 183 | 0.23 | 0.23 | 0.23 | 0.23 | 0.23 | 0.23 |
| T-9 | 0.25 | 0.25 | 0.25 | 0.25 | 0.25 | 0.25 |
| Dipropylene glycol | 0.3 | 0.3 | 0.3 | 0.3 | 0.3 | 0.3 |
| TEGOSTAB ® B 4690 | 1.2 | 1.2 | 1.2 | 1.2 | 1.2 | 1.2 |
| Water | 2.9 | 2.9 | 2.9 | 2.9 | 2.9 | 2.9 |

TABLE 4A

| Example/Property | 22 | 23 | 24 | 25 | 26 | 27 |
|---|---|---|---|---|---|---|
| Density kg/m$^3$ | 47.4 | 45.1 | 43.2 | 42.4 | 41.0 | 38.1 |
| Reduction in Density, %* | Reference | 4.9 | 8.9 | 10.6 | 13.5 | 19.6 |
| % Blowing Efficiency | 65.17 | 68.17 | 70.94 | 72.12 | 74.48 | 79.84 |
| Ball rebound, % | 59 | 58 | 61 | 61 | 61 | 63 |
| Tensile, Kpa | 141.5 | 139.4 | 131.8 | 124.2 | 124.2 | 113.2 |
| % elongation | 107 | 115 | 124 | 120 | 126 | 127 |
| Tear, N/M | 315.7 | 306.9 | 320.9 | 319.2 | 306.9 | 291.2 |
| 90% C.S. (Thickn.) | 5.8 | 6.4 | 5.9 | 5.8 | 5.2 | 4.8 |
| 75% C.S. (Thickn.) | 4.6 | 4.3 | 3.8 | 4.4 | 4.2 | 4.0 |
| MW/Crosslink-Mc | 3554 | 3596 | 3638 | 3666 | 3695 | 3739 |
| Equiv. % TDI of MDI + TDI blend | 24.15 | 26.18 | 28.17 | 29.48 | 30.76 | 32.68 |
| Equiv. % 2,4' MDI of MDI + TDI blend | 8.67 | 8.44 | 8.21 | 8.06 | 7.91 | 7.69 |
| IAF-Isocyanate Asymmetry Factor | 32.82 | 34.62 | 36.38 | 37.54 | 38.67 | 40.37 |
| 25% IFD, N | 202 | 177 | 146 | 139 | 119 | 96 |
| Support Factor % | 27 81.2 | 27 81.9 | 271 82.7 | 273 83.3 | 27 83.2 | 2.74 84.7 |
| Recovery | | | | | | |
| 25% IFD/Density$^2$ × 10$^2$ | 8.99 | 7.87 | 7.82 | 7.73 | 7.08 | 6.61 |
| Drop in polymer hardness, %** | Reference | 12.5 | 13.0 | 14.0 | 21.2 | 26.5 |

*Reduction in Density, $$\% = \frac{(\text{Density of Example} - \text{Density of Reference}) \times 100}{\text{Density of Reference}}$$

**Drop in polymer hardness, $$\% = \frac{(50\% \text{ CFD}/\text{Density}^2 \text{ of Example} - 50\% \text{ CFD}/\text{Density}^2 \text{ of Reference}) \times 100}{50\% \text{ CFD}/\text{Density}^2 \text{ of Reference}}$$

Tables 5 and 5A compares MDI/TDI compositions (MDI-D Prepolymer) according to the invention to all-MDI based compositions. In all of the examples in Table 5, foams are compared at about the same density and hardness.

In Table 5, examples 28 and 29 compare high density foams prepared with an all MDI A-side composition to that prepared with an MDI/TDI A-side composition. Example 29, which employs the MDI/TDI A-side composition, has about a 30% increased Tear strength.

Examples 30 and 31 compare medium density foams prepared with an all MDI A-side composition to that prepared with MDI/TDI A-side composition. Example 31, which employs the MDI-D prepol/TDI A-side composition, has about a 4% higher ball rebound, about 6% higher recovery, and about a 60% higher tear strength.

Examples 32 and 33 compare low density foams prepared with an all MDI A-side composition to that prepared with an MDI/TDI A-side composition. Example 32 requires 2 MDI's in order to make acceptably stable low density foam and foam physicals are poor. Example 33, which employs the MDI-D prepol/TDI A-side composition, has about 7% higher ball rebound, about 110% to 130%, improved elongation, about 50% higher tensile strength, and about 200% higher tear strength.

TABLE 5

| Example/Composition | 28 All MDI | 29 MDI/ TDI | 30 All MDI | 31 MDI/ TDI | 32 All MDI | 33 MDI/ TDI |
|---|---|---|---|---|---|---|
| % TDI of MDI + TDI Blend | 0 | 17.5 | 0 | 19 | 0 | 19 |
| R7300 | 70.9 | 0 | 75.2 | 0 | 75.15 | 0 |
| MDI-D Prepolymer | 0 | 41.67 | 0 | 45.08 | 0 | 49.36 |
| TDI 8020 | 0 | 8.73 | 0 | 10.57 | 0 | 11.58 |
| RUBINATE ® M | 0 | 0 | 0 | 0 | 18.72 | 0 |
| Index | 100 | 102 | 100 | 102 | 100 | 102 |
| RUBINOL ® F428 | 100 | 0 | 100 | 0 | 100 | 0 |
| PLURACOL ® 1117 | 0 | 100 | 0 | 100 | 0 | 100 |
| DABCO ® 33LV | 1.06 | 0 | 1.24 | 0 | 1.37 | 0 |
| NIAX ® A-1 | 0.025 | 0 | 0.029 | 0 | 0.032 | 0 |
| Dipropylene Glycol | 0 | 0.3 | 0 | 0.3 | 0 | 0.3 |
| T-9 | 0 | 0.25 | 0 | 0.25 | 0 | 0.25 |
| TEGOSTAB ® B4690 | 0 | 1.2 | 0 | 1.2 | 0 | 1.2 |
| Water | 3.38 | 2.9 | 4.08 | 3.33 | 4.82 | 3.69 |

TABLE 5A

| Example/Composition | 28 All MDI | 29 MDI/TDI | 30 All MDI | 31 MDI/TDI | 32 All MDI | 33 MDI/TDI |
|---|---|---|---|---|---|---|
| Density kg/m³ | 45.7 | 45.2 | 37.8 | 37.8 | 31.9 | 34.0 |
| % Blowing Efficiency | 65.17 | 68.17 | 70.94 | 72.12 | 74.48 | 79.84 |
| Ball rebound, % | 58 | 58 | 54 | 58 | 49 | 56 |
| Tensile, Kpa | 117.3 | 139.4 | 103.5 | 131.1 | 96.6 | 143.5 |
| % Elongation | 118 | 115 | 117 | 116 | 110 | 131 |
| Tear, N/M | 233.3 | 308.7 | 196.4 | 312.2 | 170.1 | 340.3 |
| 90% C.S. (Thickn.) | 60 | 6.4 | 5.7 | 6.2 | 9.1 | 8.5 |
| 25% IFD, N | 181.6 | 177.1 | 156.6 | 145.5 | 124.2 | 127.3 |
| Support Factor | 2.5 | 2.7 | 2.6 | 2.7 | 28 | 27 |
| % Recovery | 5.9 | 81.9 | 74.4 | 80.1 | 71.3 | 77.6 |
| 75% HACS | 5.9 | 7.4 | 6.7 | 9.4 | 10.5 | 11.4 |

What is claimed is:

1. A process for preparing flexible polyurethane foam comprising the steps of:

A) providing a mixing apparatus capable of metering and mixing at least three separate reactive chemical component streams;

B) providing a first reactive chemical component stream consisting essentially of a TDI series isocyanate composition;

C) providing a second reactive chemical component stream consisting essentially of an MDI series isocyanate composition, wherein the MDI series isocyanate composition constitutes from 60 to 99% by weight of all isocyanates used in the process of preparing the flexible polyurethane foam;

D) providing a third reactive chemical component stream comprising at least one polyol;

E) providing a blowing agent consisting essentially of water, wherein the water in foam formulation ranges from 0.5 to 8.0 parts by weight, per 100 parts by weight of all polyols in the foam formulation (pphp); and F) metering and mixing together the first, second and third reactive chemical component streams and the blowing agent simultaneously by using the mixing apparatus under conditions suitable for the generation of flexible polyurethane foam;

wherein the Isocyanate Asymmetry Factor (IAF) of the foam formulation, calculated according to Formula-I, conforms to the following:

a) IAF ranges from 10 to 20, when the water content of the formulation is in the range of 0.5 to 2.0 pphp;

b) IAF ranges from 20 to 30, when the water content of the formulation is in the range of 2.0 to 3.0 pphp;

c) IAF ranges from 30 to 40, when the water content of the formulation is in the range of 3.0 to 4.0 pphp; and d) IAF ranges from 40 to 50, when the water content of the formulation is in the range of 4.0 to 8.0 pphp;

wherein $$IAF = 100[(pbw\ 2,4'\text{-}MDI\ \text{in formulation})/125.2 + (pbw\ TDI\ \text{in formulation})/87]/[total\text{-}NCO\ \text{equivalents in formulation}]; \quad \text{Formula I.}$$

2. The process according to claim 1, wherein the ratio of the MDI series isocyanates to the TDI series isocyanates used in the preparation of the flexible foam can be changed without using any new chemical component streams and without changing the compositions of any of the existing chemical component streams.

3. A foam prepared according to the process of claim 2 which does not exhibit collapse or shrinkage during foaming, the foam having predominantly open cells upon reaching a tack-free state.

* * * * *